US012060824B1

(12) United States Patent
Yu

(10) Patent No.: US 12,060,824 B1
(45) Date of Patent: Aug. 13, 2024

(54) HYDROGEN OR HYDROGEN RICH GAS MIXTURE FUELED INTERNAL COMBUSTION ENGINE USING PREMIXED DIRECT GAS INJECTION

(71) Applicant: ARAMCO SERVICES COMPANY, Houston, TX (US)

(72) Inventor: Xin Yu, New Hudson, MI (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/296,858

(22) Filed: Apr. 6, 2023

(51) Int. Cl.
*F02B 23/10* (2006.01)
*F02B 17/00* (2006.01)
*F02D 41/40* (2006.01)
*F02D 41/38* (2006.01)

(52) U.S. Cl.
CPC .......... *F02B 23/101* (2013.01); *F02B 17/005* (2013.01); *F02D 41/40* (2013.01); *F02B 2023/102* (2013.01); *F02D 2041/389* (2013.01)

(58) Field of Classification Search
CPC ................. F02B 23/101; F02B 17/005; F02B 2023/102; F02D 41/40; F02D 2041/389
USPC ....... 123/260, 261, 263, 264, 268, 286, 288, 123/299, 300, 525, 527, 531, 532, 123/DIG. 12
See application file for complete search history.

(56) References Cited

U.S. PATENT DOCUMENTS 5,522,357 A * 6/1996 Nogi ........................ F02B 19/10 123/295
7,040,281 B2 * 5/2006 Crawford ............ F02B 23/0657 123/305
7,162,994 B2 1/2007 Li et al.
7,822,530 B2 * 10/2010 Shinagawa ........... F02D 19/024 701/103

(Continued)

FOREIGN PATENT DOCUMENTS

AU 2009267206 * 1/2010 ............. F02M 25/03
CN 103161562 * 5/2016 ................ F02B 5/02

OTHER PUBLICATIONS

H. L. Yip et al.; "A Review of Hydrogen Direct Injection for Internal Combustion Engines: Towards Carbon-Free Combustion", Applied Sciences; vol. 9; Issue 22; Nov. 12, 2019; pp. 1-30 (30 pages).

(Continued)

*Primary Examiner* — Hai H Huynh
(74) *Attorney, Agent, or Firm* — Osha Bergman Watanabe & Burton LLP

(57) ABSTRACT

An engine includes a combustion chamber, a fuel injector, a spark plug, and a piston. The combustion chamber receives air from an intake valve, which receives air from an external environment of the engine. The fuel injector includes a fuel channel, a fuel port, an air port, a needle valve, and a premixing tube. The fuel channel receives fuel from a fuel supply. The needle valve initially covers the fuel port, and actuates to fluidly connect the fuel port to the fuel channel such that the fuel port receives the fuel. The air port draws air into the fuel injector, and the premixing tube mixes the (Continued)

air and fuel to create a mixture. The mixture is fed into the combustion chamber along a central axis of the premixing tube such that the mixture intersects the electrode of the spark plug, which ignites the mixture to actuate the piston.

20 Claims, 8 Drawing Sheets

(56) References Cited

U.S. PATENT DOCUMENTS

| | | | |
|---|---|---|---|
| 9,790,868 | B2 | 10/2017 | Huang et al. |
| 10,273,891 | B2 * | 4/2019 | Martin ............... F02M 21/0245 |
| 11,156,181 | B1 | 10/2021 | Alger et al. |
| 2008/0257304 | A1 | 10/2008 | Noda et al. |

OTHER PUBLICATIONS

A. Mohammadi et al.; "Performance and combustion characteristics of a direct injection SI hydrogen engine", International Journal of Hydrogen Energy; vol. 32; 2007; pp. 296-304 (9 pages).
Z. Stepien, "A Comprehensive Overview of Hydrogen-Fueled Internal Combustion Engines: Achivements and Future Challenges", Energies; vol. 14; Issue 14; No. 6504; Oct. 11, 2021; pp. 1-26 (26 pages).
R. Babayev et al.; "Computational comparison of the conventional diesel and hydrogen direct-injection compression-ignition combustion engines", Fuel; vol. 307; Sep. 9, 2021; pp. 1-13 (13 pages).
S. Oh et al.; "Experimental investigation of the hydrogen-rich offgas spark ignition engine under the various compression ratios", Energy Conversion and Management; vol. 201; 2019; pp. 1-12 (12 pages).
Kazi Mostafijur Rahman; "Experimental Investigation and CFD Simulation of Mixture Formulation and Combustion in Hydrogen Direct Injection Spark-Ignition Engine", Doctoral Dissertation, Okayama University, Japan; Mar. 2018; pp. 1-241 (241 pages).
S. Verhelst and T. Wallner, "Hydrogen-fueled internal combustion engines", Progress in Energy and Combustion Science; vol. 24; Sep. 18, 2009; pp. 490-527 (38 pages).

* cited by examiner

HYDROGEN OR HYDROGEN RICH GAS MIXTURE FUELED INTERNAL COMBUSTION ENGINE USING PREMIXED DIRECT GAS INJECTION

BACKGROUND

One potential method for reducing emissions output by an internal combustion engines involves combusting hydrogen gas or a hydrogen rich gas mixture, such as hydrogen and natural gas. The hydrogen gas or gas mixture has a lower carbon content than other commonly used combustible mixtures, which results in a lower carbon emission output. However, for a traditional injector, the ideal time to combine a gas mixture with air and combust the air and gas mixture varies according to the desired effect. While mixing the hydrogen gas with air early in an engine cycle (i.e., premixing) reduces Nitric Oxide (NOx) emissions, a mixture produced early in the cycle is also prone to preignition, causing low engine efficiency with a limited compression ratio. On the other hand, mixing the hydrogen gas with air late in the engine cycle provides a higher fuel efficiency at the cost of increased NOx emissions due to the unmixed combustion components. Thus, the ideal timing to inject hydrogen gas into an engine cycle is balanced between fuel efficiency and NOx emissions with a traditional injector design, and this tradeoff limits the potential for further efficiency improvement and NOx emission reduction.

SUMMARY

An engine includes a combustion chamber, a fuel injector, a spark plug, and a piston. The combustion chamber receives air from an intake valve of the engine, which receives the air from an external environment of the engine. The engine further includes a fuel injector, which includes a fuel channel, a fuel port, an air port, a premixing tube, and a needle valve. The fuel channel receives fuel from a fuel supply, at which point the needle valve actuates from a first position to a second position. In the first position the needle valve covers the fuel port, and in the second position the fuel port is fluidly connected to the fuel channel and the fuel port receives fuel from the fuel channel. The air port draws air from the combustion chamber of the engine into the fuel injector. The premixing tube mixes the air from the air port and the fuel from the fuel channel to create an air and fuel mixture, and feeds the air and fuel mixture into the combustion chamber in a spray path following a central axis of the premixing tube. The spark plug includes an electrode positioned within the combustion chamber such that the central axis intersects the electrode. When the fuel and air mixture impacts the electrode, the electrode ignites the air and fuel mixture, causing the piston to actuate in the combustion chamber.

A method for combusting an air and fuel mixture in an engine includes injecting fuel from a fuel supply into a fuel channel of a fuel injector. The method further includes actuating a needle valve from a first position to a second position. The first position is a position in which the needle valve covers a fuel port of the fuel injector. The second position is a position in which the fuel port is fluidly connected to the fuel injector such that the fuel is transmitted from the fuel channel to the fuel port. Once the fuel is transmitted to the fuel port, air is drawn from an external environment of the engine, through a combustion chamber, into an air port of the fuel injector. The air and the fuel is subsequently passed into a premixing tube of the fuel injector, where the air and the fuel is mixed to create the air and fuel mixture. Once mixed, the air and fuel mixture is sprayed in a spray path along a central axis of the premixing tube that intersects an electrode of a spark plug. Finally, the method includes combusting the air and fuel mixture in the combustion chamber, which actuates a piston of the engine.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility.

DETAILED DESCRIPTION

Figure 1:
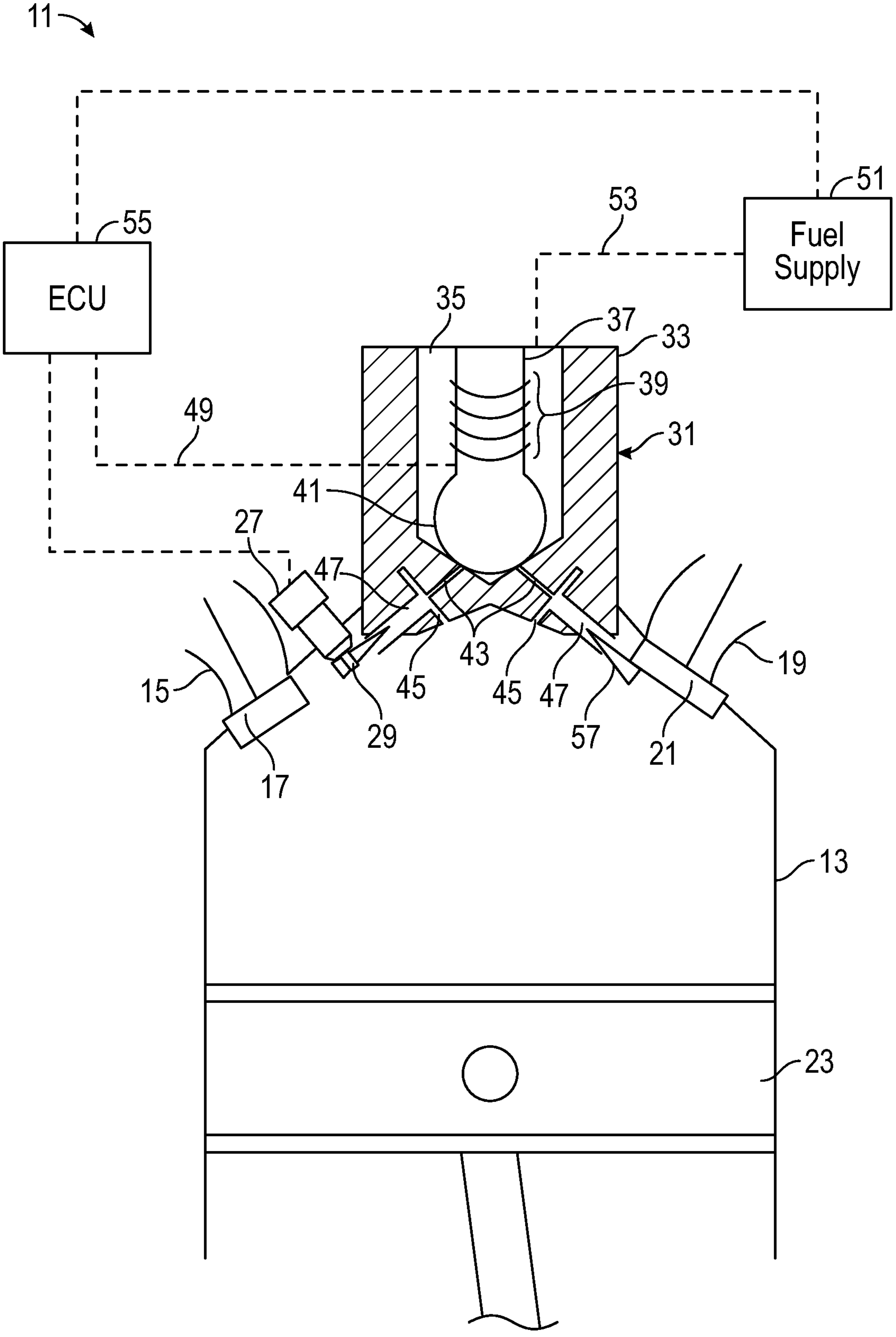
FIG. 1 depicts an engine in accordance with one or more embodiments disclosed herein.

Specific embodiments of the disclosure will now be described in detail with reference to the accompanying figures. In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not intended to imply or create any particular ordering of the elements nor to limit any element to being only a single element unless expressly disclosed, such as using the terms “before”, “after”, “single”, and other such terminology. Rather, the use of ordinal numbers is to distinguish between the elements. By way of an example, a first element is distinct from a second element, and the first element may encompass more than one element and succeed (or precede) the second element in an ordering of elements.

In addition, throughout the application, the terms “upper” and “lower” may be used to describe the position of an element in an engine as described herein. In this respect, the term “upper” denotes an element disposed vertically above a corresponding “lower” element relative to an engine as a whole, while the term “lower” conversely describes an element disposed vertically below corresponding “upper” element. Likewise, the term “axial” refers to an orientation substantially parallel to an extension direction of an object, while the term "radial" denotes a direction orthogonal to an axial direction.

In general, one or more embodiments of the disclosure are directed towards an internal combustion engine that directly injects a premixed fuel and air mixture into a combustion chamber of an engine in the late stages of an engine cycle. The fuel of the air and fuel mixture may be formed entirely of hydrogen gas, or may be formed of a gas mixture such as hydrogen and natural gas, for example. The fuel is then mixed with the air in a premixing tube before being fed into the combustion chamber to assist a combustion reaction. A brief summary of the engine cycle is presented below.

During an intake stroke of the engine cycle, air is drawn through an intake valve into a combustion chamber of the engine. This air is then compressed to a high pressure and temperature during the compression stroke, which forces the air into a fuel injector body below a needle valve of the fuel injector. At the end of compression stroke, high pressure hydrogen rich gas mixture is fed into a fuel port of the fuel injector. During this stage, the flow velocity of the fuel gets accelerated by the fuel port due to its small cross section. Subsequently, the cross section of the fuel port expands into an air port and a premixing tube of the fuel injector, and the larger diameter creates a low pressure zone that draws air through the air port into the premixing tube of the fuel injector. The air and hydrogen gas are mixed in the fuel injector, and the premixed air hydrogen rich gas mixture is forced out of the fuel injector directly into the combustion chamber as a direct injection premixture. The premixture exits the fuel injector at multiple points of the injector such that one stream of the premixture impacts an electrode of a spark plug, while another stream of the premixture is injected directly into the combustion chamber. While still in the compression phase, a spark plug ignites the premixture and initiates a combustion phase of the engine cycle. The initiated combustion reaction spreads throughout the combustion chamber, combusts the remaining premixture streams, and expands the piston to complete the engine cycle.

FIG. 1 depicts an engine 11 in accordance with one or more embodiments disclosed herein. As shown in FIG. 1, an engine 11 includes a combustion chamber 13. The combustion chamber 13 is formed on the interior of the engine 11, and is generally delimited by the structure of an upper and lower block of the engine 11. The combustion chamber 13 includes an intake port 15 that receives air from an exterior environment of the engine. The amount of air drawn into the combustion chamber 13 varies according to the operating position of an intake valve 17, which covers the intake port 15 of the combustion chamber 13. The combustion chamber 13 also includes an exhaust port 19 that is covered by an exhaust valve 21. The exhaust port 19 and the exhaust valve 21 collectively serve to facilitate the expulsion of burnt gases from the combustion chamber 13 following a combustion reaction. The combustion chamber 13 further includes a piston 23 that compresses gases in the combustion chamber 13 during a compression phase of the engine cycle. Similarly, during the combustion phase, the piston 23 is thrust downward to expand the combustion chamber 13 and provide power to the engine 11.

The combustion reaction of the combustion chamber 13 is initiated and controlled by a spark plug 27 and a fuel injector 31 that are disposed in an upper region of the combustion chamber 13. As shown in FIG. 1, the fuel injector 31 is connected to a fuel supply 51, such as a fuel tank or a fuel cell, via a fuel line 53. The fuel line 53 is a hollow tube that transmits fuel, such as hydrogen or a hydrogen gas mixture as described above, to the fuel injector 31. The fuel supply 51 and the fuel line 53 may be formed, for example, of a metal such as stainless steel or aluminum, or a polymer such as rubber, nylon, Teflon, or equivalent. Further, the fuel supply 51 may be formed of the same material or of different material(s) from the fuel line 53. Thus, the fuel supply 51 transmits fuel to the fuel injector 31 via the fuel line 53, which allows the fuel injector 31 to premix the hydrogen fuel (or fuel mixture) with air prior to expelling the hydrogen fuel into the combustion chamber 13.

To receive the hydrogen fuel, the fuel line 53 is connected to a fuel channel 35 disposed in the fuel injector 31. The fuel channel 35 is formed as a space between a fuel injector body 33 of the fuel injector 31 and a needle valve 37 of the fuel injector 31. As shown in FIG. 1, the fuel injector body 33 is solid and may be formed of a material such as steel or an equivalent metal. Similarly, the needle valve 37 may be formed of stainless steel, bronze, iron, cobalt, nickel, or an equivalent metal or alloy, and is surrounded by the fuel injector body 33. Thus, as hydrogen fuel (or a fuel mixture) is fed into the fuel channel 35 between the fuel injector body 33 and the needle valve 37, the fuel injector 31 fills with hydrogen fuel that is used to facilitate a combustion reaction in the combustion chamber 13 as described below.

Continuing with FIG. 1, the fuel injector 31 includes an electromagnetic coil 39 that serves to actuate the needle valve 37. When the fuel channel 35 has sufficiently filled with hydrogen fuel, an Electronic Control Unit (ECU) 55 directs power to the electromagnetic coil 39 via a bus 49. The bus 49 is one or more wires, harnesses, and components that serve to transmit power and control instructions from the ECU 55 to the electromagnetic coil 39. After receiving power and control signals from the ECU 55 via the bus 49, the electromagnetic coil 39 is energized, which creates an electromagnetic field that actuates the needle valve 37. To interact with the electromagnetic field, the needle valve 37 is magnetized. The magnetization process may include forming the needle valve 37 out of a ferromagnetic material such as iron, cobalt, or nickel as described above, or, alternatively, coating the needle valve 37 with a magnetic layer as part of a surface coating process.

The needle valve 37 further includes a bulbous shaped valve head 41 that contacts the fuel injector body 33. As shown in FIG. 1, the fuel injector body 33 further includes a fuel port 43, an air port 45, and a premixing tube 47 that serve to fluidly connect the fuel channel 35 to the combustion chamber 13. When the needle valve 37 is at rest, the needle valve 37 covers the fuel port 43, which prevents the fuel channel 35 from connecting to the fuel port 43. When the ECU 55 energizes the electromagnetic coil 39, the needle valve 37 is actuated (e.g., FIG. 4) and separates the contact between the needle valve 37 and the fuel injector body 33. This allows the hydrogen fuel disposed in the fuel channel 35 to flow into the fuel port 43.

The fuel port 43 is fluidly connected to an air port 45 and a premixing tube 47 as shown in FIG. 1. When the needle valve 37 is actuated, the fuel port 43 is also fluidly connected to the fuel channel 35 as described above. The fluid velocity of fuel exiting the fuel channel 35 to the fuel port 43 increases due to smaller nozzle cross-sectional area of the fuel port 43. The sudden increase in the cross-sectional area of the air port 45 and the premixing tube 47 causes the gas pressure to drop at the intersection of the air port 45 and the fuel port 43. The lowered gas pressure creates a low pressure zone, which causes air to flow from the combustion chamber 13 into the air port 45. Alternatively or additionally, air may be forced into the air port 45 by the piston 23 as part of the compression phase of the engine 11 cycle. Subsequently, the hydrogen fuel in the fuel port 43 diffuses to the premixing tube 47, which causes the hydrogen fuel (or mixture) to mix with the air disposed in the air port 45 and the premixing tube 47. This forms a hydrogen fuel and air premixture 57 in the premixing tube 47, which is expelled into the combustion chamber 13.

The premixture 57 is ignited in the combustion chamber 13 with the use of a spark plug 27. The spark plug 27 includes an electrode 29 that is disposed in the spray path of the premixture 57 exiting the premixing tube 47. Thus, the premixture 57 exits the premixing tube 47 and impacts the electrode 29 as a controlled stream, which is ignited by powering the spark plug 27 with the ECU 55 and causing the electrode 29 to spark. The premixture 57 may be forced out of the premixing tube 47 by actuating the needle valve 37, or passively diffused in a spray path into the combustion chamber 13 by nature of the geometry of the premixing tube 47.

As is commonly known in the art, an engine 11 typically includes a single spark plug 27 per each combustion chamber 13. Furthermore, FIG. 1 depicts that a fuel injector 31 is formed with two or more premixing tubes 47, which are disposed on opposite sides of the fuel injector 31. Thus, while one of the premixture 57 sprays will directly impact the electrode 29, the remaining premixture 57 spray will be sprayed into the combustion chamber 13 away from the electrode 29. The second premixture 57 spray is then subsequently ignited as the combustion reaction spreads from the electrode 29 through the combustion chamber 13. Overall, the combustion reaction is formed using the premixture 57 formed in the fuel injector 31, and the reaction drives the piston 23 down to create power in the engine 11. Following the combustion reaction, an exhaust valve 21 is actuated to uncover an exhaust port 19, and the burnt combustion gases are forced out of the engine 11 during the exhaust phase, which is the last portion of the engine cycle. Subsequently, the engine 11 restarts the engine cycle by drawing air through the intake port 15 with the intake valve 17.

Figure 2:
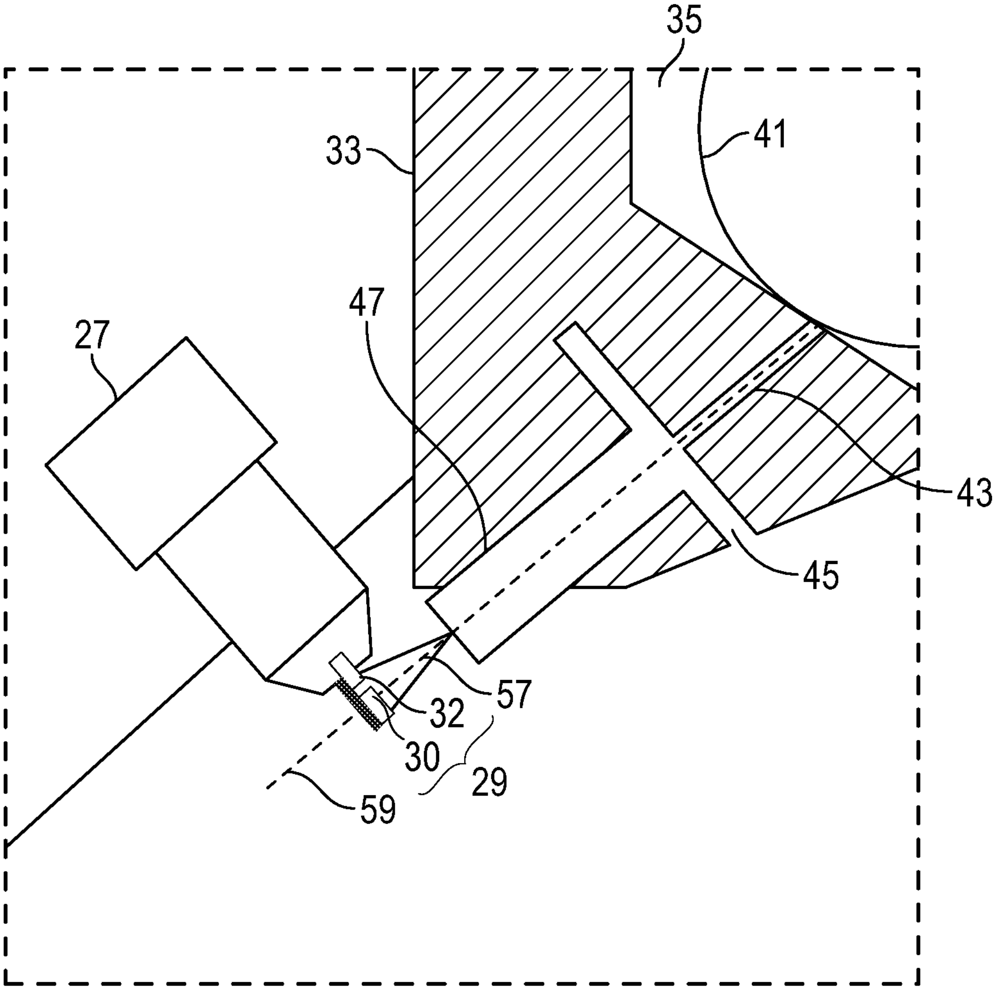
FIG. 2 depicts a partial view of a fuel injector in accordance with one or more embodiments disclosed herein.

FIG. 2 depicts a close up view of the fuel injector 31 and the electrode 29 in accordance with one or more embodiments disclosed herein. As shown in FIG. 2 and as discussed above, the fuel injector 31 has a fuel injector body 33 with a fuel port 43, an air port 45, and a premixing tube 47 disposed therein. The premixing tube 47 has a central axis 59 that extends in an axial direction through the premixing tube 47. The fuel port 43 is disposed in continuation of the central axis 59 of the premixing tube 47 such that the fuel port 43 and the premixing tube 47 are extensions of each other and the fuel port 43 is coaxial with the central axis 59. The fuel port 43 and the premixing tube 47 intersect and fluidly connect at an air port 45 that primarily extends in a radial direction at an angle orthogonal to the central axis 59, and thus the premixing tube 47 and the fuel port 43.

As described above, the valve head 41 of the needle valve 37 covers the fuel port 43 during a period of time in which the fuel channel 35 is filled with fuel. The period of time may be determined according to a manufacturer's specification, a gas transfer rate from the fuel supply 51 to the fuel channel 35, or a similar metric. After the predetermined period of time, the valve head 41 is actuated, which allows the fuel to flow from the fuel channel 35 to the fuel port 43. During this time, the air port 45 is filled with air, and may be filled as a consequence of a low pressure from expelling the fuel into the fuel port 43, or alternatively by forcing air into the air port 45 with the piston 23 during a compression phase of the engine cycle. Similarly, the premixing tube 47 receives air from the air port 45 and fuel from the fuel port 43 as a consequence of the diffusive properties of the fuel and air, as a consequence of the valve head 41 actuating, a consequence of a piston (e.g., FIG. 1) actuating, or a combination thereof. After receiving the air and the fuel in the premixing tube 47, the fuel and air mix to form a premixture 57 of air and fuel.

The premixture 57 is transmitted from the premixing tube 47 in a spray path following the central axis 59. As shown in FIG. 2, the spark plug 27 is arranged in the combustion chamber 13 such that the electrode 29 intersects the central axis 59 of the premixing tube 47. As such, when the premixture 57 exits the premixing tube 47 the premixture 57 is sprayed in the space between a ground electrode 30 and a center electrode 32 that collectively form the electrode 29. The electrode 29 is electrified, which causes a spark to develop in the vicinity of the electrode 29 that ignites the premixture 57. Due to the fact that the premixture 57 is sprayed between the ground electrode 30 and a center electrode 32 of the electrode 29, and the fact that the premixture 57 is formed in the premixing tube 47 separate from the combustion chamber, the premixture 57 is easier to ignite than a fuel mixture formed directly in the combustion chamber 13. This is because a premixture 57 mixed in the premixing tube 47 is at least partially mixed prior to enter the combustion chamber 13, while a mixture formed in the combustion chamber 13 itself may have varying concentration levels across the combustion chamber 13. Thus, by spraying a premixture 57 at the electrode 29 in a space between the ground electrode 30 and the center electrode 32 from the premixing tube 47, an engine 11 equipped with a fuel injector 31 has an efficient and thorough overall combustion.

Figure 3:
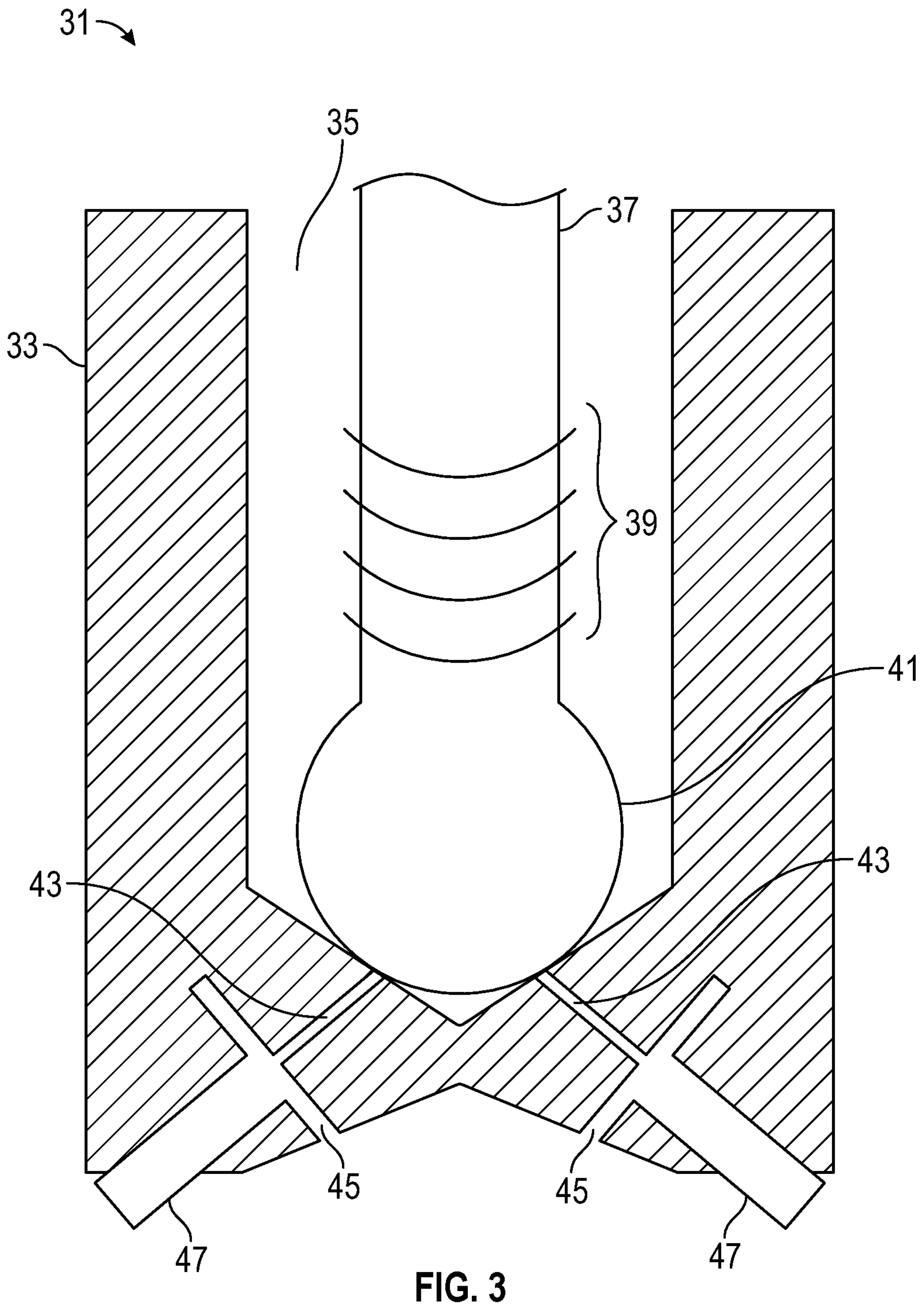
FIG. 3 depicts a fuel injector in accordance with one or more embodiments disclosed herein.
Figure 4:
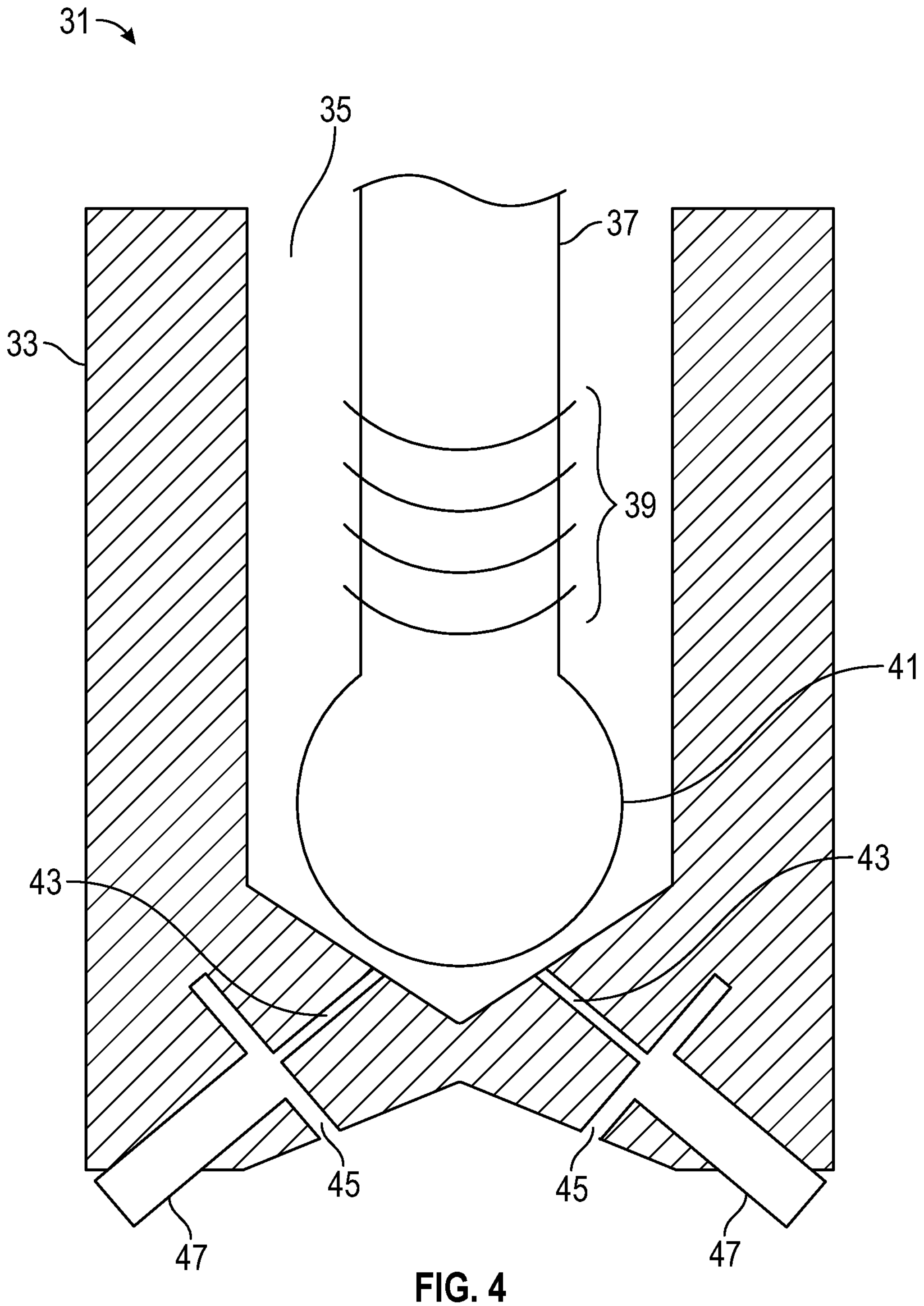
FIG. 4 depicts a fuel injector in accordance with one or more embodiments disclosed herein.

FIGS. 3 and 4 are directed towards actuating a needle valve 37 of a fuel injector 31 from a first position to a second position in accordance with one or more embodiments disclosed herein. Specifically, FIG. 3 depicts the needle valve 37 in a first position in which a valve head 41 of the needle valve 37 covers the entrance to the fuel port 43. In this position, the fuel channel 35 and the fuel port 43 are disconnected, and the fuel channel 35 is filled with fuel. It is further noted that the valve head 41 contacts the fuel port 43 at its lowest point such that the valve head 41 abuts against the fuel injector body 33 in a first position. Thus, if the electromagnetic coil 39 fails to properly energize then the needle valve 37 will be stuck in the first position preventing fuel transfer. This is beneficial in cases where the ECU 55 and/or electromagnetic coil 39 fail, as the fuel injector 31 is unable to provide fuel to the engine 11 which prevents further damage to the engine 11 from lean or rich combustion ratios.

Once a predetermined amount of fuel has entered the fuel channel 35, the needle valve 37 is actuated and fuel flows from the fuel channel 35 to the needle valve 37. The predetermined amount of fuel may be determined according to an operator's specification, the operating conditions of the engine, a predetermined air to fuel ratio, the geometry of the components of the engine 11, and/or other associated factors. Although not shown, the fuel injector 31 may further include a sensor, such as a float level sensor (not shown) or equivalent, that measures the amount of fuel in the fuel channel 35 and actuates the needle valve 37 accordingly.

Turning to FIG. 4, FIG. 4 depicts the needle valve 37 in a second position where the fuel channel 35 is fluidly coupled to the fuel port 43. The needle valve 37 is actuated by energizing an electromagnetic coil 39 that surrounds the needle valve 37. As noted above, the needle valve 37 is formed of a ferromagnetic or equivalent magnetic material that interacts with a magnetic field created by the electromagnetic coil 39. Thus, the energization of the electromagnetic coil 39 causes the needle valve 37 to actuate in a vertical direction relative to the fuel injector body 33. The actuation of the needle valve 37 separates the valve head 41 from the fuel port 43, which fluidly connects the fuel channel 35 and the fuel port 43 and allows the fuel to enter the fuel port 43. The needle valve 37 may alternatively be actuated with a motor, a servo motor, a solenoid, or equivalent component that is controlled by an ECU 55 (e.g., FIG. 1).

Figure 5:
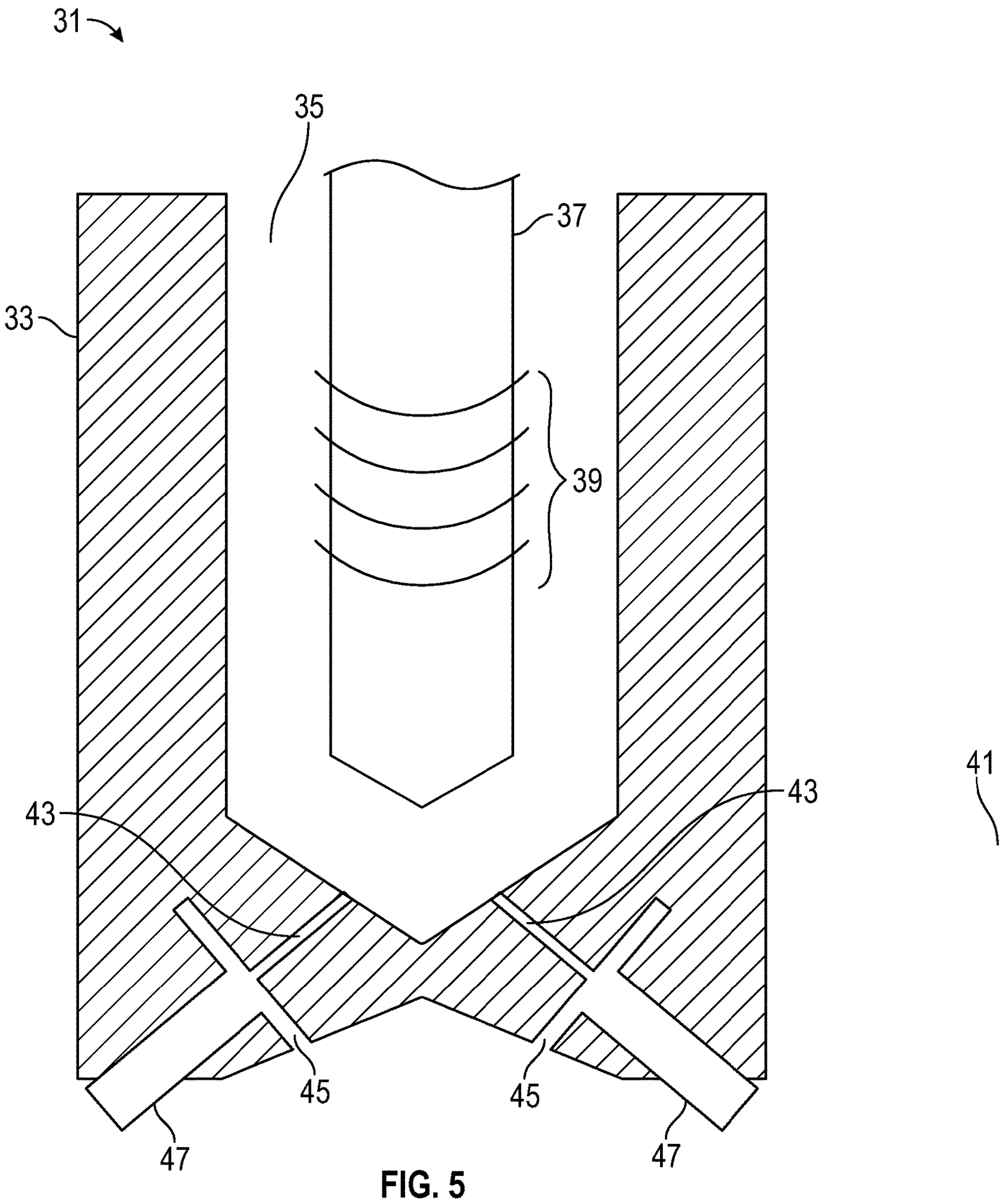
FIG. 5 depicts a fuel injector in accordance with one or more embodiments disclosed herein.

FIG. 5 depicts an alternative embodiment of a valve head 41 of the needle valve 37 according to one or more embodiments disclosed herein. As shown in FIG. 5, the valve head 41 is conical in nature, and has sides sloped to match the internal profile of the fuel injector body 33. Such is in contrast to FIGS. 1-4, in which the valve head 41 is bulbously shaped.

Figure 6:
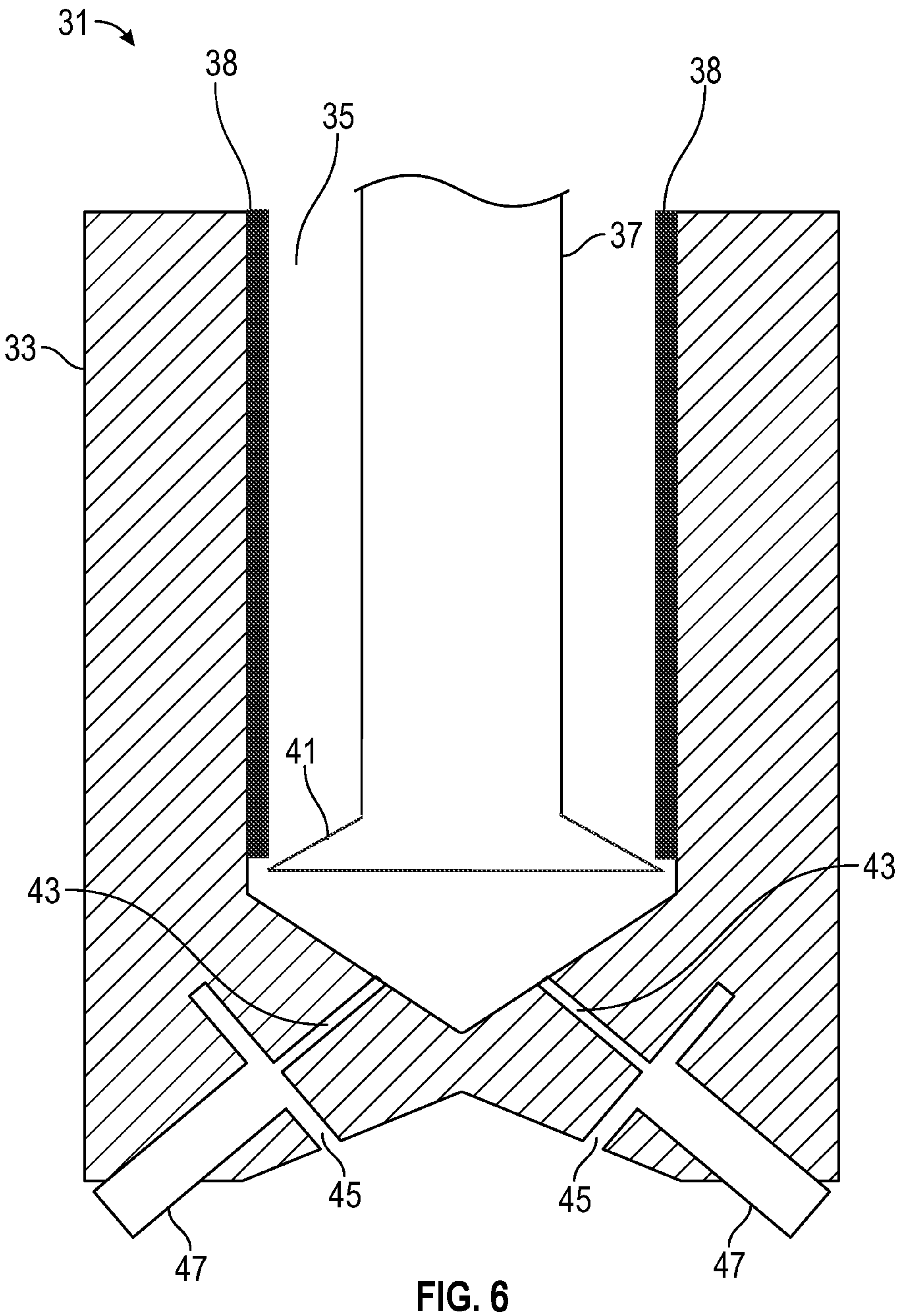
FIG. 6 depicts a fuel injector in accordance with one or more embodiments disclosed herein.

FIG. 6 depicts another embodiment of a valve head 41 of the needle valve 37 according to one or more embodiments disclosed herein. As depicted in FIG. 6, the valve head 41 (referred to herein as an "outwardly facing" valve head) of the needle valve 37 has flared edges that extend outwards from the needle valve 37 towards the fuel injector body 33. In this case, the fuel injector body 33 includes sidewalls 38 that extend away from the fuel injector body 33 towards the needle valve 37. The needle valve 37 is normally biased to abut against the sidewalls 38, which creates a fluid-tight seal between the needle valve 37 and the fuel injector body 33. When fuel is injected into the fuel channel 35, the fuel pressure imparts a normal force on the outwardly-facing valve head 41 that causes the needle valve 37 to actuate towards the air port 43.

The valve head 41 offers different benefits based upon the profile thereof. Specifically, a bulbous valve head 41 is not affected by material tolerances as much as a conical valve head 41, as only a small portion of the bulbous shaped valve head 41 contacts the fuel injector body 33. On the other hand, due to the large contact area between a conical valve head 41 and the fuel injector body 33, a conically shaped valve head 41 is more effective at sealing the fuel port 43 from the fuel channel 35 than a bulbous valve head 41. The outwardly facing needle valve head 41 is also effective at sealing the fuel port 43 due to being influenced by the internal pressure of the combustion chamber 13, but requires a fuel injector 33 to include sidewalls 38. Furthermore, while a bulbous valve head 41 is easier to center between the sloped surfaces of the fuel injector body 33, it is easier to form a conically shaped valve head 41 than a bulbous valve head 41, as a conical shape requires merely removing a small amount of material from a rod shaped block of material. In contrast, a needle valve 37 having a bulbous shaped valve head 41 or an outwardly facing valve head 41 is formed of two pieces rigidly fixed together with a process such as brazing or welding. Thus, whether the valve head 41 has a bulbous shape or a conical shape is determined according to the use case of the fuel injector 31.

Figure 7:
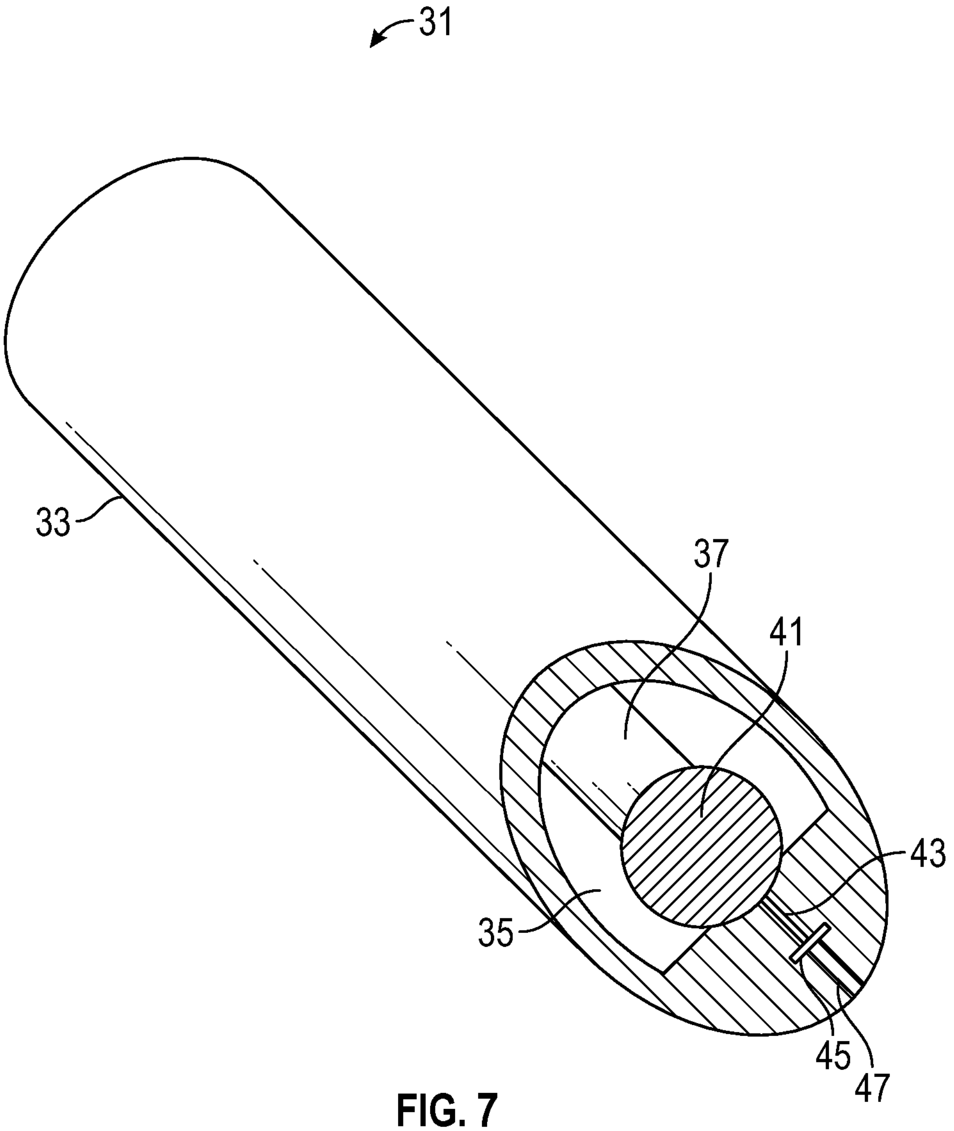
FIG. 7 depicts an isometric view of a fuel injector in accordance with one or more embodiments disclosed herein.

FIG. 7 depicts an isometric view of a fuel injector 31 in accordance with one or more embodiments disclosed herein. Specifically, FIG. 7 depicts that a fuel injector 31 includes a fuel injector body 33, which is a cylindrical device that is formed with a hollow cavity, labeled as the fuel channel 35, disposed therein. FIG. 7 further depicts that the fuel channel 35 includes a fuel port 43, an air port 45, and a premixing tube 47 that collectively extend through the fuel injector body 33. Finally, the fuel injector 31 includes a needle valve 37 with a valve head 41, which serves to fluidly connect and disconnect the fuel channel 35 from the air port 45.

As shown in FIG. 7, the fuel injector body 33 is configured with a single fuel port 43, air port 45, and premixing tube 47. Such is in contrast to the embodiments of FIGS. 1-6, which include multiple premixing tubes 47 and associated components in a fuel injector body 33. However, it is noted that the number of fuel ports 43, air ports 45, and premixing tubes 47 may vary according to the use case of the fuel injector body 33. Specifically, a higher number of premixing tubes 47 facilitates a smoother combustion response, as the combustion reaction spreads through a combustion chamber 13 more evenly as a result of the increased streams of fuel. However, a higher number of premixing tubes 47 incurs a higher manufacturing cost. Thus, the number of fuel ports 43, air ports 45, and premixing tubes 47 varies according to the contemplated use case for a fuel injector body 33.

During operation and as described above, fuel such as hydrogen gas or a hydrogen rich gas mixture is fed into the fuel channel 35. As shown in FIG. 7, the valve head 41 of the needle valve 37 abuts against the fuel port 43, and, thus, the valve head 41 fluidly disconnects the fuel port 43 from the fuel channel 35. As such, when fuel enters the fuel channel 35, the fuel surrounds the needle valve 37 and valve head 41. The fuel is retained in the fuel channel 35 until a latter portion of the compression phase, at which point the needle valve 37 is actuated with an electromagnetic coil (e.g., FIG. 1) as described above.

Figure 8:
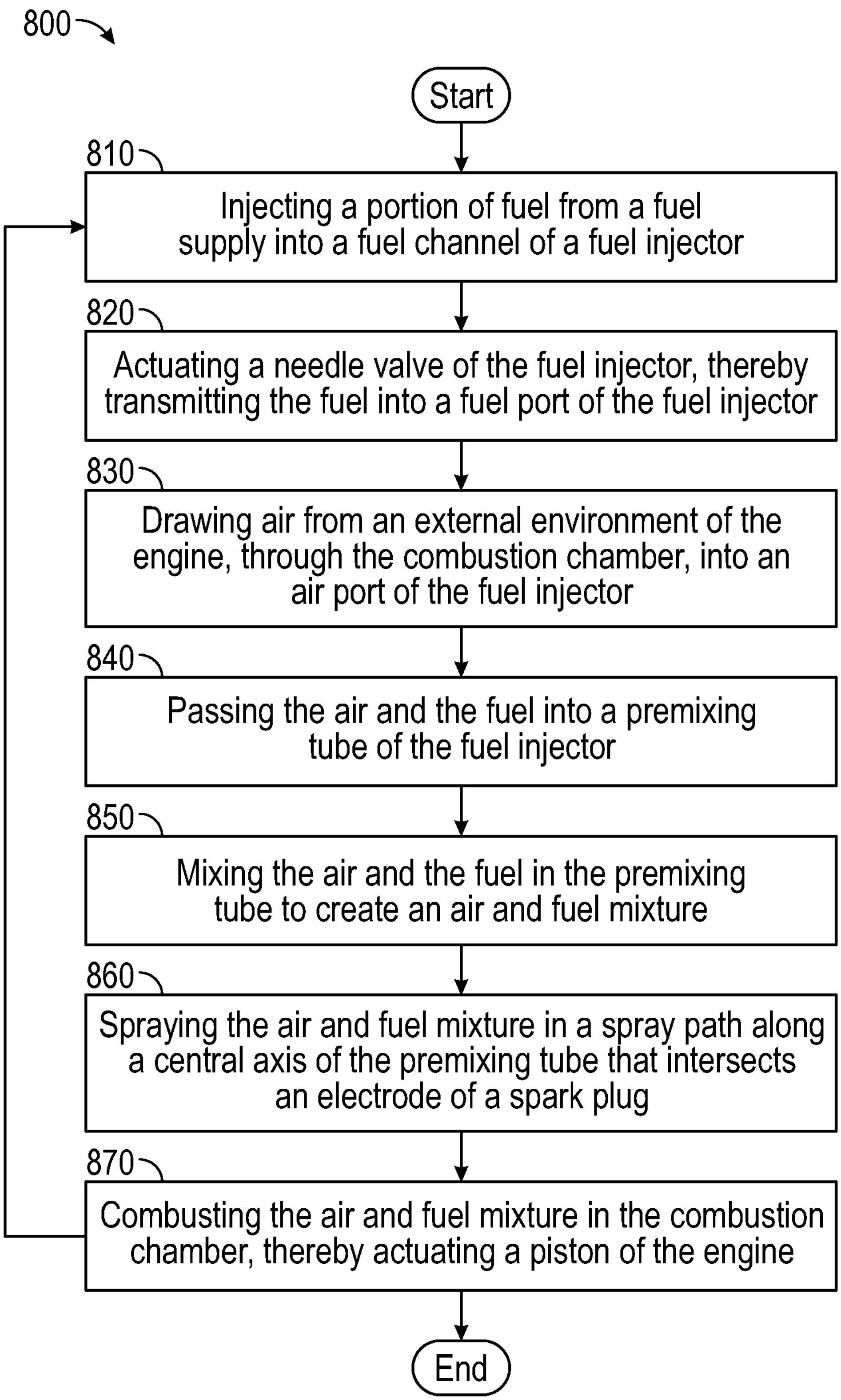
FIG. 8 depicts a flowchart of a method in accordance with one or more embodiments disclosed herein.

FIG. 8 depicts a method for combusting a fuel and air mixture in an engine. While the various flowchart blocks in FIG. 8 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In step 810, a portion of fuel is injected into a fuel channel 35 of a fuel injector body 33 by a fuel supply 51 during a compression phase of the engine cycle. The fuel may be, for example, a hydrogen gas or a hydrogen gas mixture. The hydrogen gas mixture may include gases such as natural gas or methane gas, which is mixed with hydrogen to form a mixture that is fed into the fuel channel 35. The fuel fills the fuel channel 35 to a predetermined amount, which may be determined based upon the engine 11 operating conditions, the geometry of a combustion chamber, and/or the geometry of the fuel injector body 33, for example. After the fuel channel 35 is filled to the predetermined amount, the method proceeds to step 820.

In step 820, a needle valve 37 of the fuel channel 35 is actuated, which fluidly connects the fuel channel 35 to the fuel port 43. The needle valve 37 may be actuated using an electromagnetic coil 39, for example, or alternatively actuated with a solenoid, motor, or equivalent device. As described above, the needle valve 37 covers a fuel port 43 to prevent fuel from inadvertently transferring from the fuel channel 35 to the fuel port 43. To do this, the needle valve 37 abuts against the fuel injector body 33 of the fuel channel 35 at the point where the fuel port 43 expands into the fuel channel 35. Thus, step 820 includes actuating the needle valve 37 away from the fuel port 43, which severs the contact between the needle valve 37 and the fuel port 43 and fluidly connects the fuel port 43 to the fuel channel 35. This allows the fuel to transfer into the fuel port 43, at which point the method proceeds to step 830.

In step 830, air is drawn from an external environment of the engine 11 into the combustion chamber 13, and from the combustion chamber 13 into an air port 45 of the fuel injector 31. It is noted that step 830 may be performed as multiple, separate steps (i.e., a first step of drawing air in the combustion chamber 13 with an intake valve 17, and a second step of moving air from the combustion chamber 13 to the air port 45) or as a single step without departing from the nature of this disclosure. In the event that step 830 is broken into multiple steps, the multiple steps may be performed before or after other steps of FIG. 8, and may be performed at the same time or spaced apart by other steps of FIG. 8.

Notwithstanding the above, step 830 initiates with air being drawn into the combustion chamber 13 by way of an intake valve 17, which actuates to fluidly connect the combustion chamber 13 to the external environment of the engine 11. Air is then drawn into the combustion chamber 13 as part of the intake phase of the engine cycle, which is realized by pulling a piston 23 from the top of the combustion chamber 13 to the bottom of the combustion chamber 13. At this point, the air in the combustion chamber 13 may enter the air port 45 in one of two ways. As a first way, the air may be forced from the combustion chamber 13 into the air port 45 as part of a compression step of the engine cycle of the engine 11. Alternatively, or additionally, the air may be drawn into the air port 45 as a consequence of a low pressure in the air port 45. In this way, the fast moving fuel exiting the fuel port 43 has a low pressure, which naturally draws air into the air port 45 due to the fluid connection between the fuel port 43 and the air port 45. At this point, with air in the air port 45 and fuel in the fuel port 43, the method proceeds to step 840.

In step 840, the air and fuel is passed or otherwise drawn into the premixing tube 47. As noted above, the fuel channel 35 is filled with fuel and, thus, has a positive fluid pressure. When the fuel channel 35 is fluidly connected to the fuel port 43, the excess fluid pressure causes the fuel to pass into the fuel port 43, and subsequently into the premixing tube 47. Air disposed in the air port 45 is also drawn into the premixing tube 47 due to the stream of fuel and its relatively high velocity. Once the portions of air and fuel are in the premixing tube 47, the method proceeds to step 850.

In step 850, the air and fuel portions mix in the premixing tube 47, which forms a premixture 57 of air and fuel. The mixing of air and fuel may also be facilitated by the actuation of the piston 23, which forces air into the air port 45 and premixing tube 47. Alternatively, or additionally, the mixing of air and fuel may be facilitated by passively mixing the air and fuel. In this case, the fluid velocity of the fuel causes a low fluid pressure in the fuel that pulls the portion of air into the premixing tube 47, and the fuel and air passively mix as a result of the fuel velocity. In either case, once the air and fuel in the premixing tube 47 are mixed to form the premixture 57, the method proceeds to step 860.

In step 860, the premixture 57 is sprayed from the premixing tube 47, and thus the fuel injector 31, in a spray path along a central axis 59 of the premixing tube 47. The central axis 59 intersects the ground electrode 30 and the center electrode 32 of the electrode 29 of a spark plug 27. As such, when the premixture 57 is sprayed along the central axis 59, the premixture 57 impacts the electrode 29. The step of spraying the premixture 57 occurs during the latter portion of the compression stage of the engine cycle, which mitigates the chance that the premixture 57 will be prematurely ignited. At this point, once the premixture 57 impacts the electrode 29, the method proceeds to step 870.

In step 870, the premixture 57 that has impacted the electrode 29 is combusted. In this step, the spark plug 27 receives a signal from an ECU 55, and directs the electrode 29 to spark by transmitting power to the electrode 29. This causes the premixture 57 to ignite, and the combustion reaction spreads throughout the combustion chamber 13 and actuates the piston 23. As noted above, a fuel injector 31 may include multiple fuel ports 43, air ports 45, and premixing tubes 47, and each premixing tube 47 sprays a separate premixture 57 into the combustion chamber 13. However, because an engine 11 typically only includes a single spark plug 27 per combustion chamber 13, only one premixture 57 will impact the electrode 29 and be ignited thereby. The combustion reaction spreads from a single premixture 57 reaction to the other premixtures 57. The reaction of all of the premixtures 57 drives the piston 23 down in the combustion chamber 13, which completes a power stroke of the engine cycle of the engine 11. Following step 870, the method may restart at step 810 by injecting fuel into a fuel channel 35 to restart the engine cycle.

Accordingly, embodiments of the above invention are useful for forming a combustion reaction within a combustion chamber using a premixture that is formed in a fuel injector. By forming the combustion reaction using a premixture that is at least partially mixed, the combustion reaction has lower Nitric Oxide (NOx) emissions than currently existing combustion reactions. Furthermore, introducing the premixture into the combustion chamber during the latter stages of a compression phase of the engine cycle allows the premixture to enter the combustion chamber without prematurely igniting, which allows for a higher compression ratio design and thus improves engine efficiency.

Although only a few example embodiments have been described in detail above, those skilled in the art will readily appreciate that many modifications are possible in the example embodiments without materially departing from this invention.

Accordingly, all such modifications are intended to be included within the scope of this disclosure as defined in the following claims. For example, the fuel port may be formed with a gate at its opening, rather than being covered by a needle valve. Furthermore, the dimensions and positions of the fuel port, air port, and premixing tube may be varied to change the ratio of fuel to air, or to change the exit angle of the premixture spray. Finally, the system may be used with a fuel other than hydrogen, such as gasoline for example.

What is claimed is:

1. An engine, comprising:

a combustion chamber configured to receive air from an intake valve of the engine, the intake valve being configured to receive the air from an external environment of the engine;

a fuel injector comprising:

a fuel channel configured to receive fuel from a fuel supply;

a fuel port configured to receive the fuel from the fuel channel;

an air port configured to draw the air from the combustion chamber of the engine into the fuel injector;

a premixing tube configured to mix the air from the air port and the fuel from the fuel channel to create an air and fuel mixture and feed the air and fuel mixture into the combustion chamber, and a needle valve configured to actuate from a first position to a second position, wherein in the first position the needle valve covers the fuel port and in the second position the fuel port is fluidly connected to the fuel channel;

a spark plug having an electrode positioned within the combustion chamber, the electrode being configured to ignite the air and fuel mixture; and a piston configured to actuate in the combustion chamber from the ignited air and fuel mixture, wherein a central axis of the premixing tube intersects the electrode of the spark plug such that the air and fuel mixture is sprayed following the central axis from the premixing tube to the electrode.

2. The engine of claim 1, further comprising: an Electronic Control Unit (ECU) configured to actuate the needle valve from the first position to the second position via an electromagnetic coil.

3. The engine of claim 1, wherein the piston is configured to force the air from the combustion chamber into the air port.

4. The engine of claim 1, wherein the fuel channel of the fuel injector is formed as a space between the needle valve and a body of the fuel injector.

5. The engine of claim 1, wherein the premixing tube is fluidly connected to the fuel port, the air port, and the combustion chamber.

6. The engine of claim 1, wherein the fuel supply is configured to transmit the fuel into the fuel channel during a compression phase of the engine.

7. The engine of claim 1, wherein the electrode is configured to ignite the air and fuel mixture during a compression phase of the engine.

8. The engine of claim 1, wherein the needle valve is configured to abut against the fuel port in the first position in order to cover the fuel port.

9. The engine of claim 1, wherein the air port primarily extends in a direction orthogonal to the central axis.

10. The engine of claim 1, wherein the fuel is a hydrogen gas or a hydrogen gas mixture.

11. The engine of claim 1, wherein the fuel port is disposed coaxial to the central axis such that the central axis extends through the fuel port.

12. The engine of claim 1, wherein the air port is disposed at an intersection of the fuel port and the premixing tube.

13. The engine of claim 1, wherein the needle valve comprises a bulbous shaped valve head.

14. The engine of claim 1, wherein the needle valve comprises a conically shaped valve head.

15. A method for combusting an air and fuel mixture in an engine, the method comprising:

injecting fuel from a fuel supply into a fuel channel of a fuel injector;

actuating a needle valve from a first position to a second position, the first position being a position in which the needle valve covers a fuel port of the fuel injector and the second position being a position in which the fuel port is fluidly connected to the fuel injector such that the fuel is transmitted from the fuel channel to the fuel port;

drawing air from an external environment of the engine, through a combustion chamber, into an air port of the fuel injector;

passing the air and the fuel into a premixing tube of the fuel injector;

mixing the air and the fuel in the premixing tube to create the air and fuel mixture;

spraying the air and fuel mixture in a spray path along a central axis of the premixing tube, the central axis being configured to intersect an electrode of a spark plug, and combusting the air and fuel mixture in the combustion chamber, thereby actuating a piston of the engine.

16. The method of claim 15, further comprising: forcing the air from the combustion chamber into the air port.

17. The method of claim 15, further comprising: transmitting the fuel into the fuel channel during a compression cycle of the engine.

18. The method of claim 15, further comprising: igniting the air and fuel mixture during a compression cycle of the engine.

19. The method of claim 15, wherein spraying the air and fuel mixture comprises spraying the air and fuel mixture from the premixing tube into the combustion chamber.

20. The method of claim 15, wherein the air is drawn into the air port at an angle orthogonal to a direction in which the fuel is received by the fuel port from the fuel channel.

* * * * *